United States Patent
Tanaka et al.

(10) Patent No.: US 6,958,910 B2
(45) Date of Patent: Oct. 25, 2005

(54) COOLING APPARATUS FOR ELECTRONIC APPARATUS

(75) Inventors: Toshiyuki Tanaka, Laguna Niguel, CA (US); Yukihiko Hata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/717,333

(22) Filed: Nov. 18, 2003

(65) Prior Publication Data

US 2005/0105273 A1 May 19, 2005

(51) Int. Cl.[7] ................................................. H05K 7/20
(52) U.S. Cl. ..................... 361/699; 361/695; 165/80.4; 174/15.1
(58) Field of Search ................................ 361/687–689, 361/699, 700, 719, 721; 174/15.1, 15.2; 165/80.3, 80.4, 104.33, 104.26

(56) References Cited

U.S. PATENT DOCUMENTS

| | | | |
|---|---|---|---|
| 5,268,817 A | | 12/1993 | Miyagawa et al. |
| 5,731,952 A | * | 3/1998 | Ohgami et al. ............. 361/687 |
| 6,141,214 A | * | 10/2000 | Ahn ........................... 361/687 |
| 6,296,048 B1 | * | 10/2001 | Sauer ......................... 165/80.3 |
| 6,333,847 B1 | * | 12/2001 | Katsui et al. ............... 361/679 |
| 6,377,452 B1 | | 4/2002 | Sasaki et al. |
| 6,418,017 B1 | * | 7/2002 | Patel et al. ................. 361/700 |
| 6,477,871 B1 | | 11/2002 | Shaw et al. |
| 6,483,445 B1 | | 11/2002 | England |
| 6,519,148 B2 | | 2/2003 | Nakagawa et al. |
| 6,594,149 B2 | * | 7/2003 | Yamada et al. ............. 361/699 |
| 6,625,024 B2 | * | 9/2003 | Mermet-Guyennet ....... 361/700 |
| 6,755,626 B2 | * | 6/2004 | Komatsu et al. ......... 417/413.2 |
| 6,809,927 B2 | * | 10/2004 | Ohashi et al. ............... 361/699 |
| 2002/0018337 A1 | | 2/2002 | Nakamura |
| 2002/0053421 A1 | * | 5/2002 | Hisano et al. ......... 165/104.33 |
| 2002/0141159 A1 | * | 10/2002 | Bloemen .................... 361/704 |
| 2003/0039097 A1 | | 2/2003 | Igarashi |

FOREIGN PATENT DOCUMENTS

| | | |
|---|---|---|
| EP | 0 834 795 A1 | 4/1998 |
| JP | 07-049725 | 2/1995 |
| JP | 10-055227 | 2/1998 |
| JP | 2000-228128 | 8/2000 |
| JP | 2002-222026 | 8/2002 |
| JP | 2002-344186 | 11/2002 |
| JP | 2003-044169 | 2/2003 |

* cited by examiner

*Primary Examiner*—Boris Chervinsky
(74) *Attorney, Agent, or Firm*—Blakely Sokoloff Taylor & Zafman

(57) ABSTRACT

An electronic component that generates heat is enclosed in a body. A bottom panel forms a part of the body. A heat receiving portion is thermally connected to the electronic component. A heat radiating portion that radiates the heat received by the heat receiving portion forms a part of the bottom panel. A liquid cooling path, inside which liquid coolant is circulated, is thermally coupled to the heat receiving portion and the heat radiating portion.

21 Claims, 8 Drawing Sheets

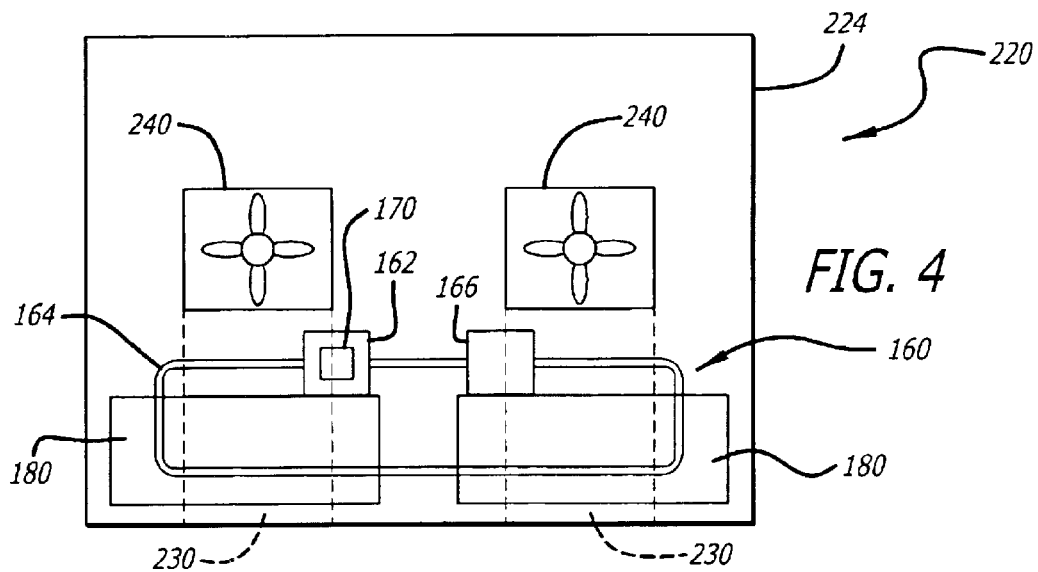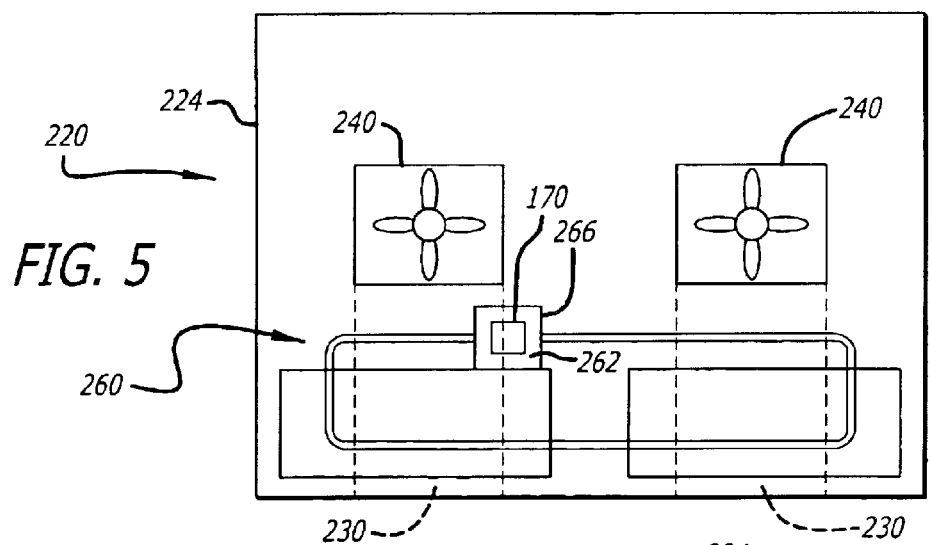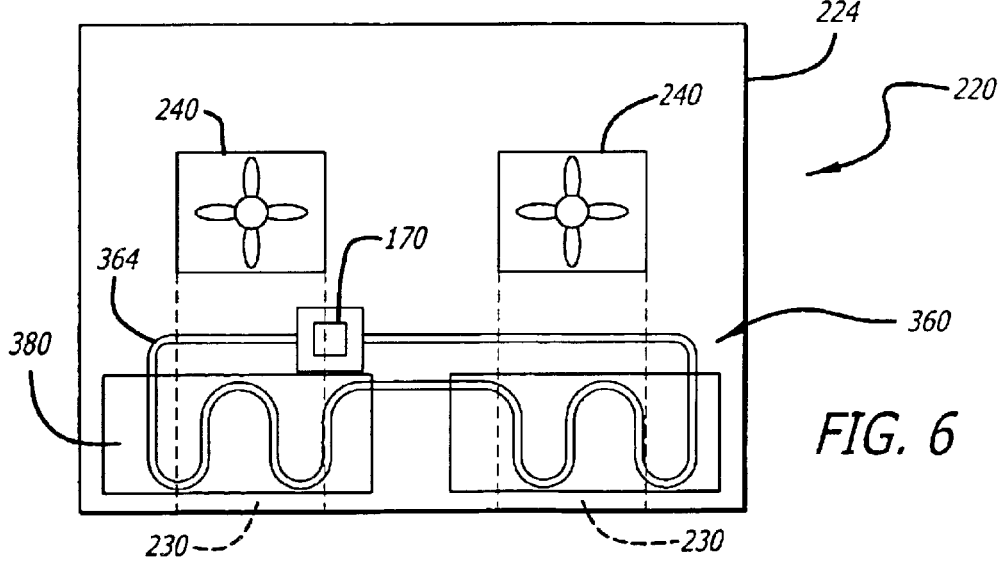

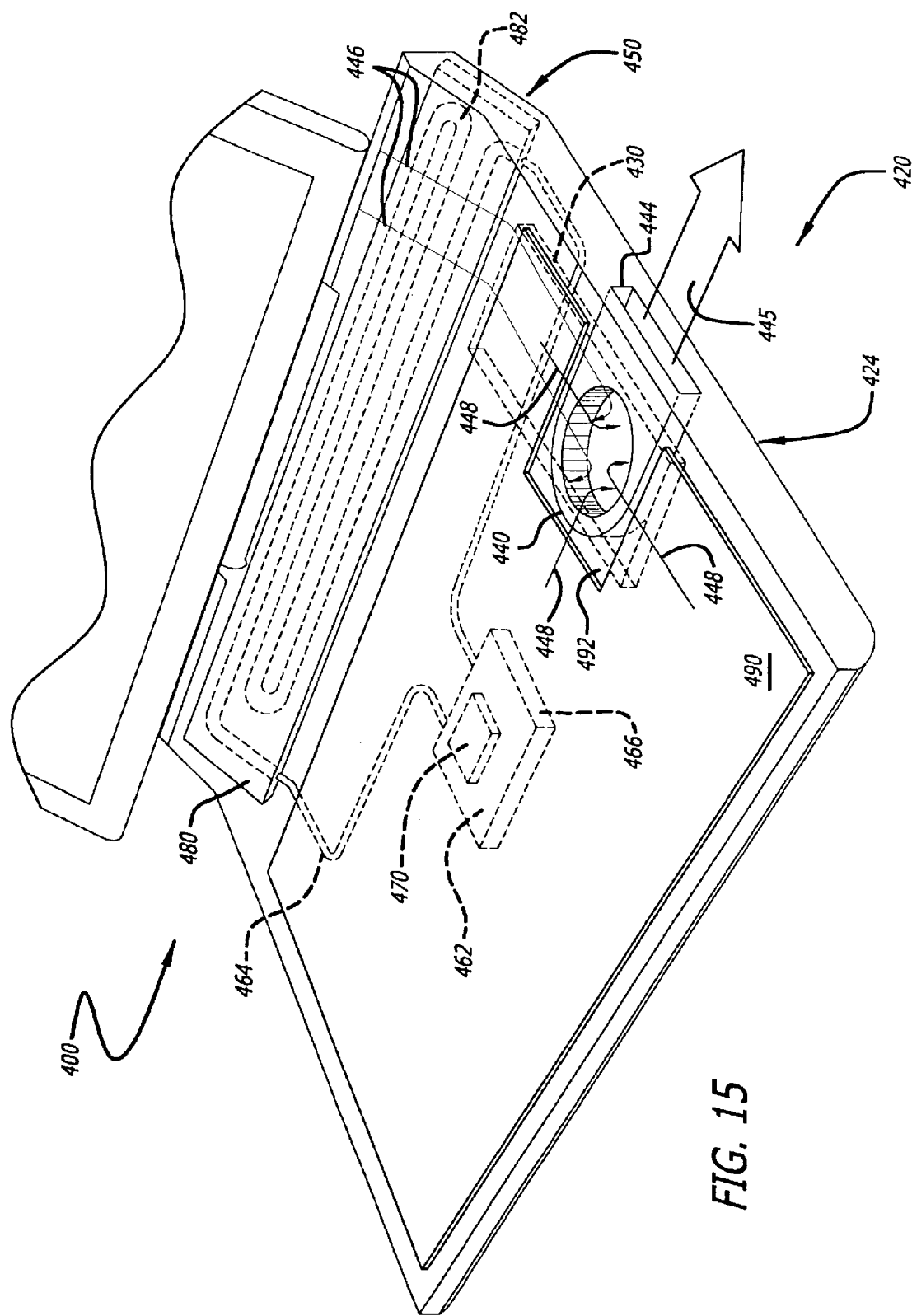

COOLING APPARATUS FOR ELECTRONIC APPARATUS

FIELD

Embodiments of the invention generally relate to the field of cooling of electronic apparatus. More specifically, embodiments of the invention relate to a cooling system that provides a liquid cooling system to transfer heat to an external surface of the electronic apparatus that is formed to improve heat transfer to the surrounding air.

GENERAL BACKGROUND

Over the past decade, there has been demand for electronic apparatus, including portable electronic apparatus such as laptop computers, with ever increasing data processing capabilities. The central processing units (CPUs) and other electronic components used in electronic apparatus are operating at increasing clock rates or otherwise being made to provide increased capabilities. The increase in processing capability is generally accompanied by an increase in heat dissipation.

It may be necessary to provide a heat dissipating system in electronic apparatus to avoid damage to the electronic components from excessive operating temperatures. Portable electronic apparatus present a particular challenge for dealing with this increase in heat dissipation because of the limited size of the portable electronic apparatus and requirements for low noise and low power consumption of the cooling apparatus. Thus it is desirable to provide a cooling apparatus that is compact, quiet, and efficient.

BRIEF DESCRIPTION OF THE DRAWINGS

Features and advantages of embodiments of the invention will become apparent from the following detailed description in which:

FIG. 4 shows a schematic plan view of a liquid cooling system.

FIG. 5 shows a schematic plan view of a second liquid cooling system.

FIG. 6 shows a schematic plan view of a third liquid cooling system.

FIG. 15 is a perspective view of the body portion of the exemplary electronic apparatus of FIG. 12 with the top of the body removed.

DETAILED DESCRIPTION

Embodiments of the invention set forth in the following detailed description generally relate to a cooling system that includes a subsystem with a liquid coolant to transfer heat to an external surface of the electronic apparatus. The external surface is formed to improve heat transfer to the surrounding air. Herein, at least one embodiment of the invention relates to a cooling system with a bottom portion of a body that is formed to improve heat transfer from the liquid coolant to the surrounding air. One embodiment of the invention relates to a cooling system that uses a forced air system to move air over the bottom portion of the body to improve heat transfer from the liquid coolant to the surrounding air.

In the following description, certain terminology is used to describe certain features of one or more embodiments. For instance, an "electronic apparatus" is defined as a product with electronic components in a body. In this detailed description, for clarity sake and for illustrative purposes only, the electronic apparatus will be illustrated as a portable laptop computer. Embodiments of the invention may be utilized in a variety of electronic apparatus including, but not limited or restricted to personal digital assistants, cellular telephones, digital cameras, video cameras, navigation systems, and the like.

Herein, terms of geometric orientation and relationship such as "up," "down," "front," "back," "top," "bottom," "vertical," and "horizontal" are used in a conventional sense as would be applied to a particular apparatus in a typical operating orientation or as may be shown in the Figures. It will be appreciated that embodiments of the invention may be used with small, portable apparatus that may be readily placed in any of a wide variety of overall orientations and that such apparatus may have more than one typical operating orientation. Changes in the overall orientation of a apparatus will, of course, alter the terms of geometric orientation and relationship that would be applied to the apparatus in any given overall orientation. Terms of geometric orientation and relationship are used herein for clarity of description and should not be read as restrictive on the broad aspects of various embodiments of the invention.

It is contemplated, that the cooling system may be configured to transfer coolant which may be not be liquid at all times or may not be a true liquid. Therefore, as used herein, the term "liquid coolant" is intended to include all coolants that have properties similar to liquid coolants.

Figure 1:
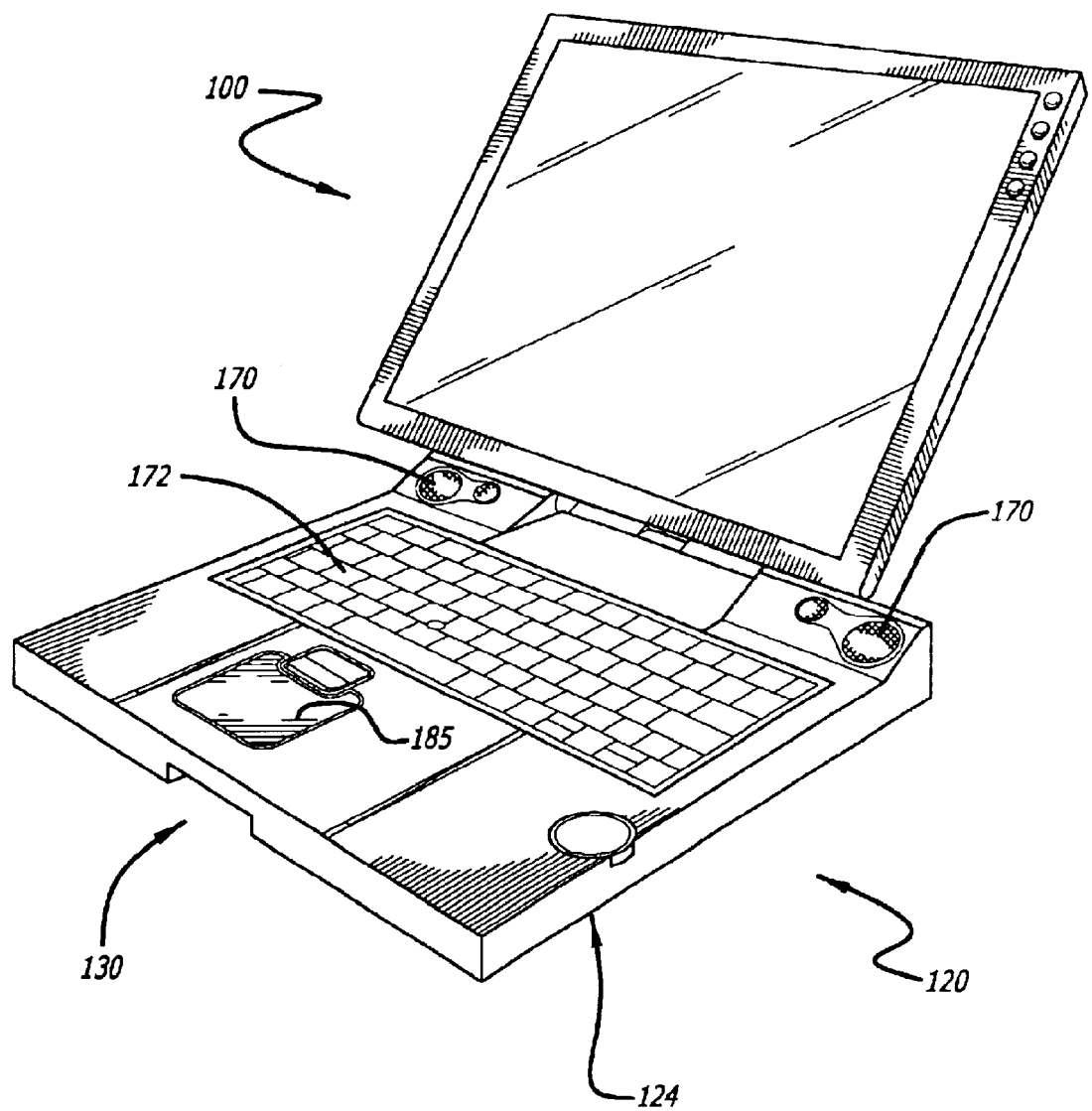
FIG. 1 is a perspective view of an exemplary electronic apparatus that includes an embodiment of the present invention.

FIG. 1 illustrates a perspective view of an exemplary electronic apparatus 100, a portable computer, that includes an embodiment of the present invention. The apparatus 100 includes a body 120. Enclosed within the body 120 are one or more electronic components that generate heat. The body 120 provides protection against foreign materials and environmental conditions.

The electronic apparatus 100 may further comprise a keyboard 172 integrated into the body 120. A secondary input apparatus 185, such as a touch pad or a track ball for example, may be integrated into the body 120 as well. In one embodiment of the invention, dual speakers 170 may be integrated into the body 120.

The one or more heat generating electronic components enclosed within the body 120 may require active cooling to prevent damage to the components from excessive temperatures. The body 120 may include a bottom panel 124 that forms a part of the exterior surface of the body 120. The bottom panel 124 may provide an air channel 130.

Figure 2:
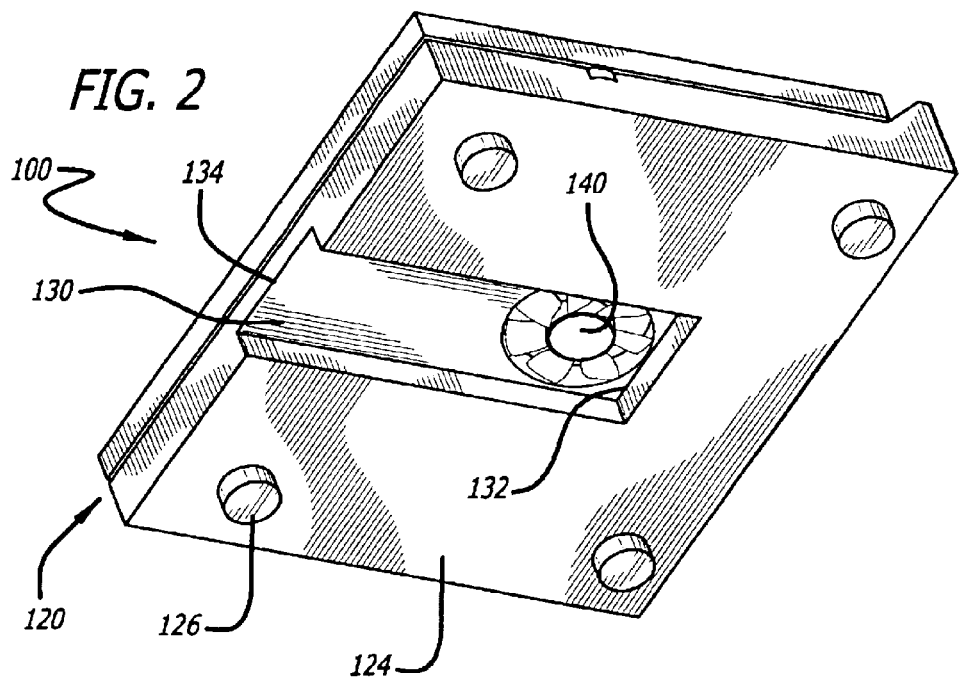
FIG. 2 is a perspective view of the exemplary electronic apparatus of FIG. 1 from a second viewpoint.

FIG. 2 illustrates a perspective view of the exemplary electronic apparatus 100 of FIG. 1 from a viewpoint that allows the bottom panel 124 and the air channel 130 to be more clearly seen.

A fan 140 may be attached to the bottom panel 124 to facilitate the transfer of air between an interior of the body 120 and a surrounding ambient airspace. The movement of air by the fan 140 may provide forced convection cooling of electronic components enclosed in the body 120. In one embodiment of the invention, the fan 140 is adapted to draw from the ambient airspace that surrounds the exterior of the body 120. In another embodiment of the invention, the fan 140 is adapted to draw from the interior of the body 120. In yet another embodiment of the invention, the fan 140 is adapted to draw from both the surrounding ambient airspace and the interior of the body 120.

The air channel 130 may have two opposing ends 132, 134. The first end 132 may be adjacent the fan 140. The opposite end 134 may be adjacent to any edge of the bottom panel 124.

Figure 3:
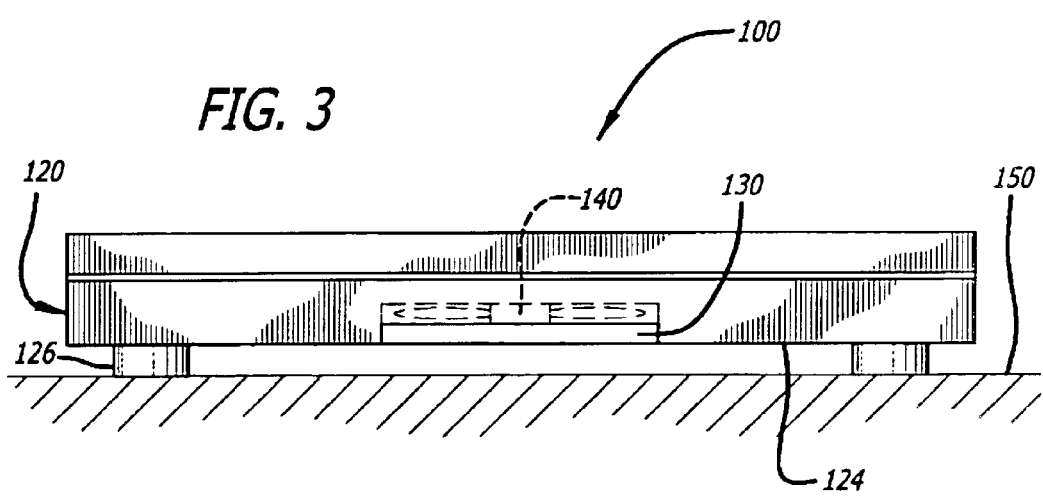
FIG. 3 is a front elevation of the electronic apparatus of FIG. 1.

FIG. 3 shows a front elevation of the body 120. The apparatus 100 will normally be supported by a surface 150 that is substantially parallel to the bottom panel 124 and separated from the bottom panel 124. Several feet 126 may be provided on the bottom panel 124 to raise the bottom panel 124 above the support surface 150 by a small distance. Because of the close proximity of the bottom panel 124 to the support surface 150, the additional clearance provided by the air channel 130 creates a relatively low resistance path for the air flow created by the fan 140. A substantial portion of the air moved by the fan 140 will pass over the exterior surfaces of the air channel 130.

FIG. 4 shows a schematic plan view of a liquid cooling system 160 included in an embodiment of the invention. In the embodiment shown, the body 220 has a bottom panel 224 that includes two air channels 230. A fan 240 is provided in the bottom panel 224 adjacent the inner end of each air channel. The liquid cooling system 160 may be thermally coupled to one or more electronic components 170 and the bottom panel 224. The liquid cooling system 160 may be adapted to transfer heat from the electronic components 170 to a circulating liquid coolant and from the liquid coolant to the bottom panel 224.

The liquid cooling system 160 may provide one or more heat receiving portions 162 adapted to transfer heat from the electronic components 170 to the liquid coolant as it circulates through the heat receiving portions 162. A pump 166 may be used to circulate the coolant through the fluid path of the liquid cooling system 160. Other means such as heat pipes may be used to circulate the coolant.

Piping 164 may provide a liquid cooling path from the heat receiving portions 162 to a heat radiating portion 180 and back to the heat receiving portions. The piping 164 may be of a metal with good thermal conductivity, such as copper for example. The piping 164 may be of a fairly small diameter and have a relatively thin wall to increase the ratio of the surface area of the piping to the volume of coolant and to reduce the thermal resistance of the pipe wall. For example, the piping 164 may have an outer diameter of about 4 millimeters (mm) and an interior diameter of about 3 mm.

In one embodiment of the invention, the heat dissipation area 180 is formed by thermally coupling the piping 164 of the liquid cooling system 160 to an interior surface of the bottom panel 224. Heat is conducted from the higher temperature coolant to the cooler bottom panel 224 and transferred to the ambient airspace adjacent the surfaces of the bottom panel 224 in the vicinity of the heat dissipation area 180. Preferably the bottom panel 224 is formed of a material with good thermal conductivity to facilitate heat transfer to the exterior surface of the bottom panel 224.

At least a portion of the heat radiating portion 180 may be adjacent at least a portion of the air channel 230. The air moved by the fan 240 that passes over the exterior surfaces of the air channel 230 increases the heat transfer away from the heat radiating portion 180. It is contemplated that different areas of the body 220 may be of different materials. For example, all or a portion of the bottom panel 224 of the body 220 may be of aluminum, another metal composition, or a thermally conductive plastic to improve thermal conductivity. The air channel portion 230 of the bottom panel 224 may be the portion formed of a material with good thermal conductivity.

FIG. 5 shows a schematic plan view of a liquid cooling system 260 included in another embodiment of the invention. A pump 266 may provide a heat receiving portion 262 as one surface of the pump. The heat receiving portion 262 is adapted to transfer heat from the electronic components 170 to the liquid coolant as it is circulated by the pump 266 through the liquid cooling path.

FIG. 6 shows a schematic plan view of a liquid cooling system 360 included in another embodiment of the invention. In this embodiment of the invention, the heat radiating portion may include a heat dissipating plate 380 coupled to the piping 364. The heat dissipating plate 380 may be configured with internal passages that are connected to the piping 364 to form part of the liquid cooling path. The internal passages may provide a meandering path for the coolant to improve the heat transfer from the coolant to the bottom panel 224 in the vicinity of the heat dissipation area.

In one embodiment, the heat dissipating plate 380 is formed from two plates. On or both of the plates may have a concave depression in the form of the liquid cooling path. The two plates may be joined together such that the concave depression forms the liquid cooling path.

In another embodiment, the heat dissipating plate 380 may include multiple internal fluid channels which may be straight or meandering. In another embodiment without a heat dissipating plate 380, the piping may be formed to provide a meandering path, such as a zigzag path, for the portion of the piping that is thermally coupled to an interior surface of the bottom panel 224.

Figure 7:
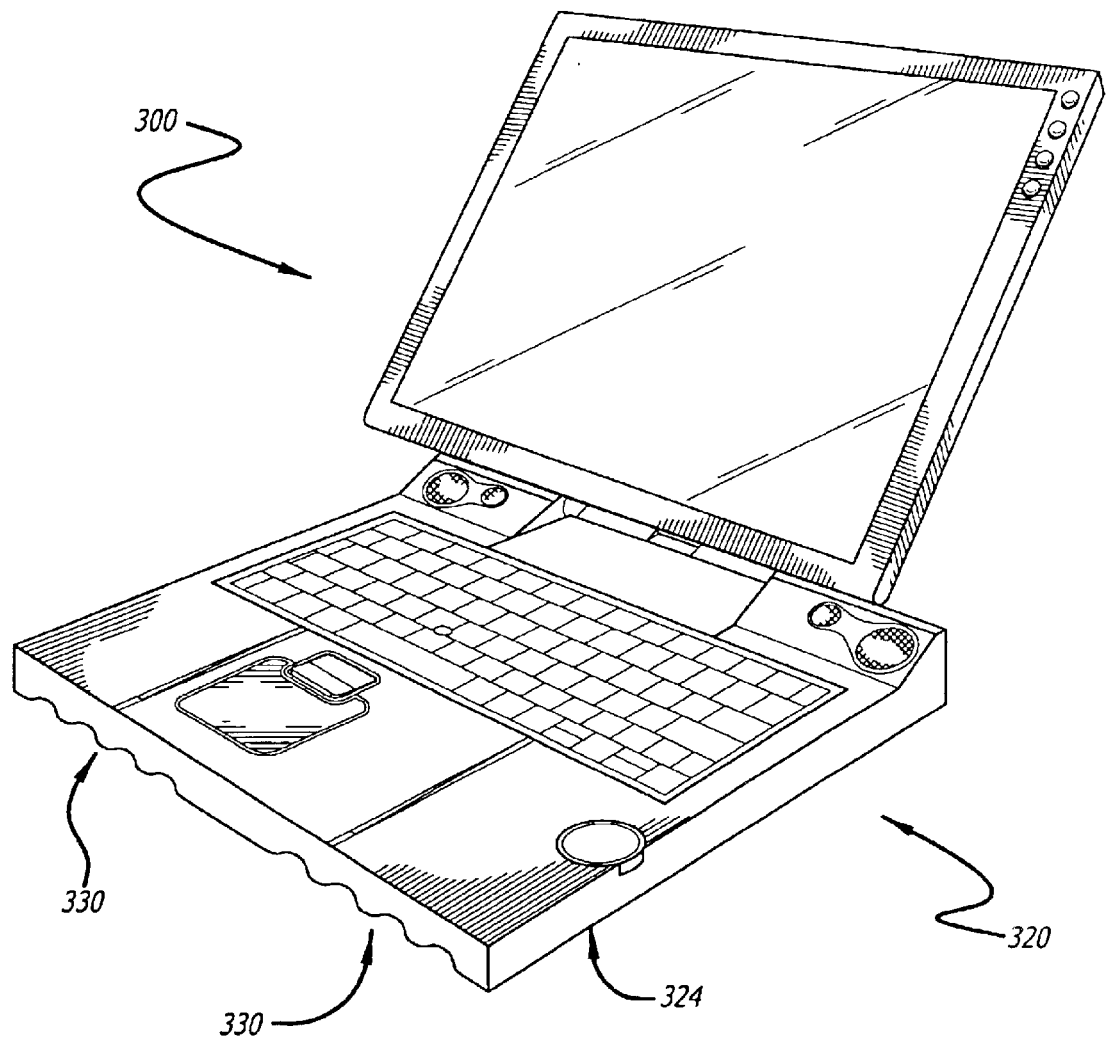
FIG. 7 is a perspective view of an exemplary electronic apparatus that includes a second embodiment of the present invention.

FIG. 7 illustrates a perspective view of another embodiment of the present invention. This embodiment is in many respects similar to the embodiment shown in FIG. 1. The body 320 may include a bottom panel 324 that forms a part of the exterior surface of the body 320. The bottom panel 324 may provide one or more air channels 330.

Figure 8:
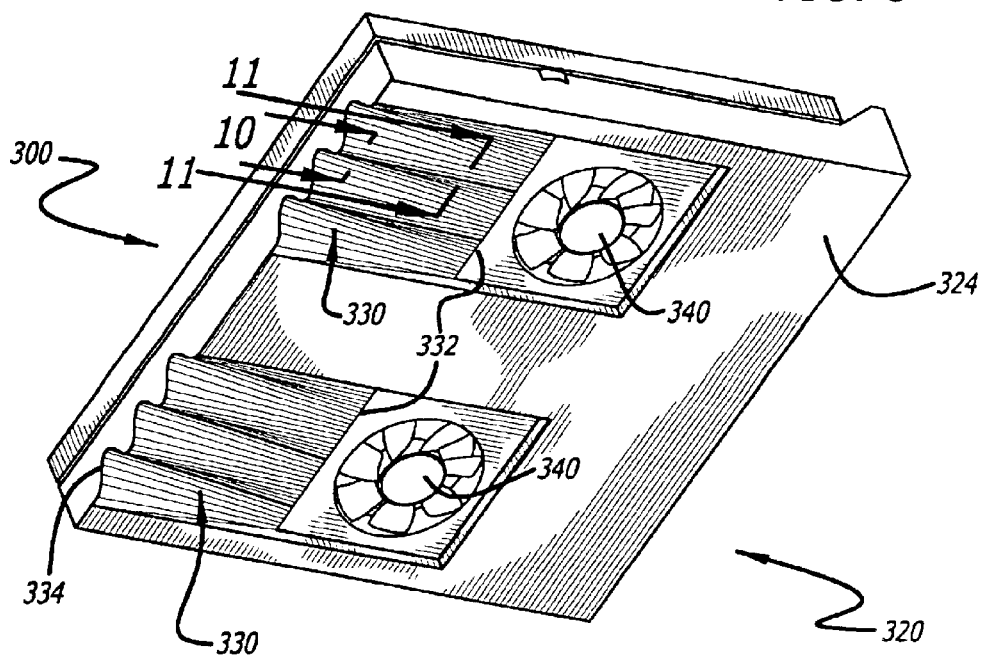
FIG. 8 is a perspective view of the exemplary electronic apparatus of FIG. 7 from a second viewpoint.

FIG. 8 illustrates a perspective view of the exemplary electronic apparatus of FIG. 7 from a viewpoint that allows the bottom panel 324 and the air channel 330 to be more clearly seen. A portion of the air channel 330 may have a convoluted or corrugated surface to increase the surface area available for heat transfer. The corrugated surface may include alternating grooves and ridges which may be substantially parallel. The corrugated surface may be faired between a front edge 334 that is corrugated and a second edge 332 that is generally straight so that the external surfaces blend smoothly. The second edge 332 may be adjacent the fan 340 such that the portion of the air channel 330 that receives the fan 340 is flat.

Figure 9:
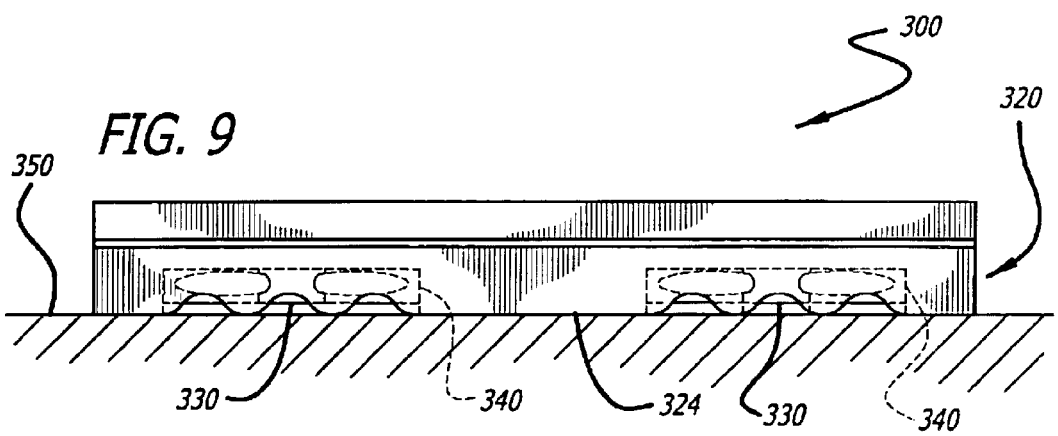
FIG. 9 is a front elevation of the electronic apparatus of FIG. 7.

FIG. 9 illustrates a front elevation of the embodiment of the invention shown in FIG. 8. The air channel 330 may provide the only air passage to the fan 340 when the electronic apparatus 300 rests flush against a support surface 350. The corrugations of a faired air channel 330 may be arranged so that the cross-sectional area of the air channel 330 is substantially the same throughout the air channel.

Figure 10:
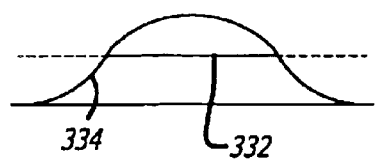
FIGS. 10 and 11 are cross-sections of the electronic apparatus of FIG. 7.
Figure 11:
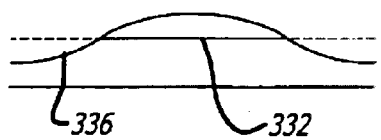

As suggested by the cross-section views of a single corrugation of the air channel 330 shown in FIGS. 10 and 11, the corrugated portion of the air channel may include excursions that extend both above and below the level of the straight edge 332 of the air channel. FIG. 10 shows the cross-section at or near the front edge 334 where the corrugation may have its greatest depth. FIG. 11 shows the cross-section at an intermediate part of the air channel where the corrugation 336 may have a lesser depth as it is faired into the flat portion 332 that receives the fan 340. In other embodiments, the corrugated portion of the air channel may have a greater or lesser cross-sectional area than the portion of the air channel adjacent the fan 340 or the cross-sectional area may vary within the corrugated portion.

Figure 12:
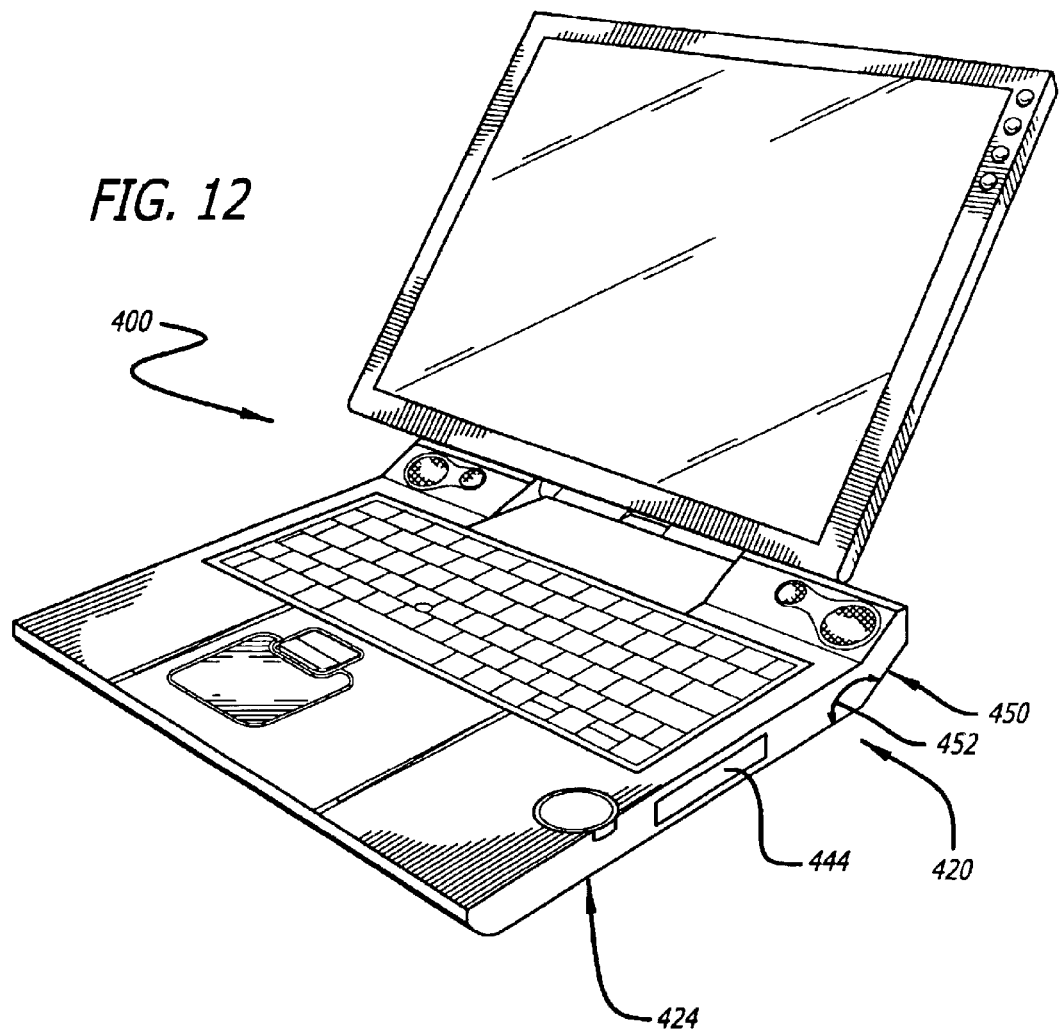
FIG. 12 is a perspective view of an exemplary electronic apparatus that includes a third embodiment of the present invention.

FIG. 12 shows another electronic apparatus 400 that includes an embodiment of the invention. In this embodiment the bottom panel 424 of the body 420 includes an inclined portion 450 along one edge, such as the back edge as illustrated. The inclined portion 450 may form an obtuse angle with the remainder of the bottom panel 424. For example, the angle 452 between the inclined portion 450 and the remainder of the bottom panel 424 may be about 135°0 or more.

Figure 13:
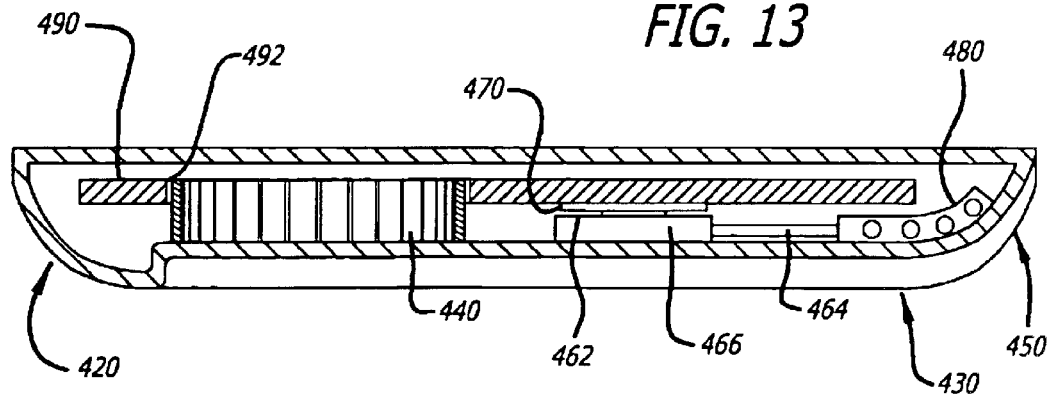
FIG. 13 is a cross-section of the electronic apparatus of FIG. 12.

FIG. 13 shows a cross-section view through an air channel 430 of the embodiment shown in FIG. 12. The air channel 430 extends to the back edge of the bottom panel 424 and the inclined portion 450. In this embodiment, the fan used to create an air flow may be a "squirrel cage" type blower 440. The air flow in the air channel 430 may increase heat dissipation of the heat received by the bottom panel 424 from the adjacent liquid cooling system. The air flow may be exhausted through a port 444 (FIG. 12) in the side wall of the body 420.

A heat dissipating plate 480 may be coupled to a portion of the back edge of the bottom panel 424 and the inclined portion 450 to form the heat radiating portion. The inclined portion 450 of the bottom panel 424 may improve the heat dissipation of the exterior surface of the bottom panel. A heat receiving portion 462 of the cooling apparatus receives heat generated by an electronic apparatus 470. The heat receiving portion 462 may be one surface of a pump 466 that circulates a liquid coolant. The liquid coolant may be circulated through piping 464 and the heat dissipating plate 480 as described above for other embodiments of the invention.

Figure 14:
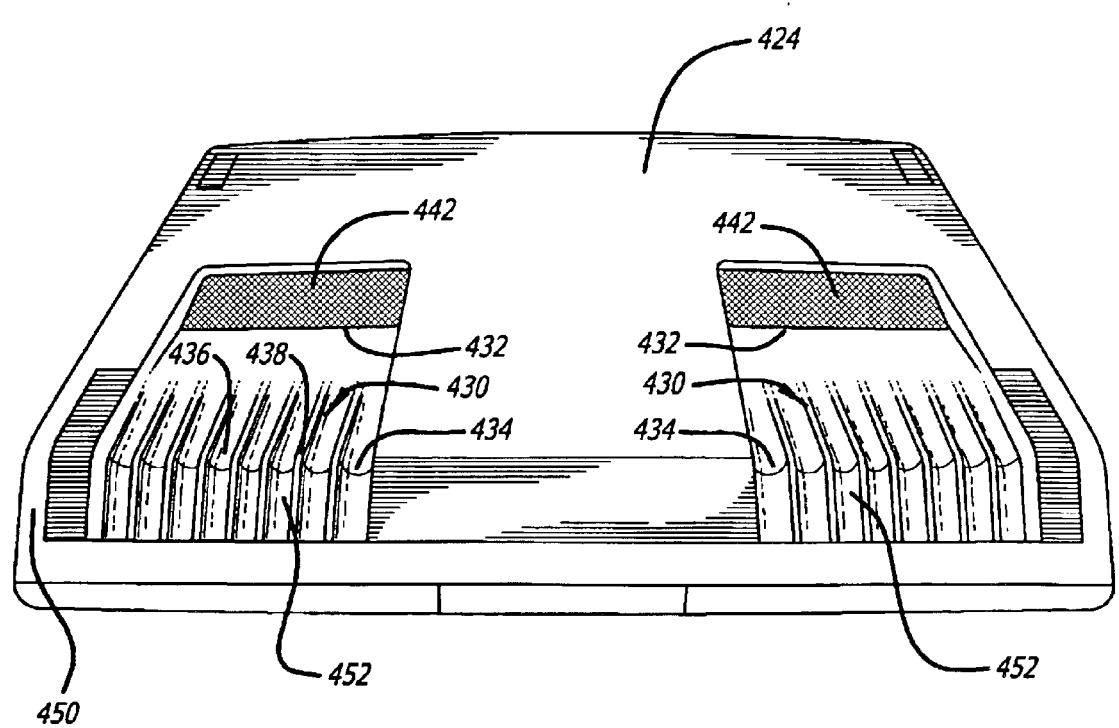
FIG. 14 is a perspective view of the exemplary electronic apparatus of FIG. 7 from a second viewpoint.

FIG. 14 illustrates a perspective view of the exemplary electronic apparatus 400 of FIG. 12 from a viewpoint that allows the bottom panel 424 and the air channels 430 to be more clearly seen. In this embodiment the air channels 430 may include a series of grooves 436 and ridges 438 to form a corrugated surface over a portion of the air channels 430. The corrugated surface may be faired between a front edge 434 that is corrugated and a second edge 432 that is straight. The second edge 432 may be adjacent the fan opening 442 such that the portion of the air channel 430 that includes the fan opening is flat.

The air channels 430 may extend over the inclined portion 450 of the bottom panel 424. The portion of the air channels 430 extending over the inclined portion 450 may be corrugated. In other embodiments, the portion of the air channels 430 extending over the inclined portion 450 may be flat or differently corrugated from the remaining portion of the air channel. In other embodiments, the air channels may extend only to the edge formed between the inclined portion 450 and the remaining portion of the bottom panel 424.

FIG. 15 illustrates a perspective view of the exemplary electronic apparatus 400 of FIG. 12 with the top surface, including the keyboard, of the body 420 removed to allow an exemplary arrangement of internal components to be seen. Some details, including some hidden lines have been omitted to improve the clarity of the view.

A printed circuit card 490 may support one or more electronic components 470 to be cooled by the inventive cooling system. The electronic components 470 to be cooled may be mounted on the lower surface of the printed circuit card 490 such that the electronic components are between the printed circuit card and the bottom panel 424 of the body 420.

The liquid cooling system is coupled to the electronic components 470 through heat receiving portions 462 that may be one surface of the pump 462 that circulates the liquid coolant. The liquid coolant may be circulated through piping 464 and the heat dissipating plate 480. The heat dissipating plate 480 may be coupled to the inclined portion 450 of the bottom plate 424 as part of the heat radiating portion. In other embodiments, the heat dissipating plate 480 may be coupled to the remainder of the bottom plate or to both the inclined portion and the remainder of the bottom plate to form the heat radiating portion.

FIG. 15 illustrates an exemplary air flow. The fan 440 is arranged to draw air from both upper and lower sides of the fan. The fan 440 may extend to an opening 492 in the printed circuit board 490. The air 448 drawn into the upper side of the fan 440 may be drawn over one or both surfaces of the printed circuit board 490 which may facilitate the convective cooling of components on the printed circuit board which may include the components 470 that are cooled by the liquid cooling system.

The air 446 drawn into the lower side of the fan 440 from the surrounding ambient airspace may be drawn over the exterior surface of the air channel 430 which may facilitate the convective cooling of the bottom panel 424 of the body, possibly including the inclined portion 450. This in turn may facilitate the transfer of heat from the liquid coolant in the heat radiating portion. The air may be exhausted to the surrounding ambient airspace through a vent 444 in the side wall of the body 420. It will be appreciated that a second fan may be provided with a similar structure to provide air flow and cooling for the second air channel. In another embodiment the air flow may be reversed with air being drawn in from the surrounding ambient airspace through an inlet in the side wall of the body 420 and exhausted to the surrounding ambient airspace through the air channels 430 and possibly vents elsewhere in the body.

While certain exemplary embodiments have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An apparatus comprising:
   an electronic component that generates heat;
   a body that encloses the electronic component, and has a bottom panel;
   a pump having a heat receiving portion thermally connected to the electronic component;
   a heat radiating portion that radiates the heat received by the heat receiving portion, the heat radiating portion forming a part of the bottom panel; and
   a liquid cooling path inside which liquid coolant is circulated by the pump, the liquid cooling path being thermally coupled to the heat receiving portion and the heat radiating portion.

2. The apparatus according to claim 1, wherein the heat radiating portion includes an air channel thereon.

3. The apparatus according to claim 2, further comprising a fan arranged in the bottom panel, which moves air over the air channel.

4. The apparatus according to claim 3, wherein the exterior surface of the air channel has a corrugated configuration.

5. The apparatus according to claim 4, wherein the fan is adapted to draw from the surrounding ambient airspace.

6. The apparatus according to claim 4, wherein the fan is adapted to draw from the interior of the body.

7. The apparatus according to claim 4, wherein the fan is adapted to draw simultaneously from the surrounding ambient airspace and the interior of the body.

8. The apparatus according to claim 1, wherein the bottom panel includes an inclined portion forming an obtuse angle with a remaining portion of the bottom panel, the inclined portion being a part of the heat radiating portion.

9. The apparatus according to claim 8, wherein the liquid cooling path is arranged to transfer heat from the liquid coolant to the inclined portion.

10. An apparatus comprising:
    an electronic component that generates heat;
    a body that encloses the electronic component and has a bottom panel, the bottom panel includes an inclined portion forming an obtuse angle with a remaining portion of the bottom panel;
    a heat receiving portion thermally connected to the electronic component with, the inclined portion being a part of the heat radiating portion;
    a heat radiating portion that radiates the heat received by the heat receiving portion, the heat radiating portion forming a part of the bottom panel; and
    a liquid cooling path inside which liquid coolant is circulated, the liquid cooling path being thermally coupled to the heat receiving portion and the heat radiating portion.

11. The apparatus according to claim 10, wherein the liquid cooling path is arranged to transfer heat from the liquid coolant to the inclined portion.

12. An apparatus for cooling an electronic component that generates heat, the apparatus comprising:
    a body that encloses the electronic component;
    a bottom panel that forms a part of the exterior surface of the body;
    means for providing an air channel in the bottom panel;
    means for transferring heat from the electronic component to a liquid coolant and from the liquid coolant to the bottom panel; and
    means for moving air between an interior of the body and a surrounding ambient airspace such that a substantial portion of the air is moved over an exterior surface of the air channel.

13. The apparatus according to claim 12, wherein the exterior surface of the air channel has a corrugated configuration.

14. The apparatus according to claim 12, wherein the bottom panel further includes an inclined portion forming an obtuse angle with a remaining portion of the bottom panel.

15. The apparatus according to claim 14, further comprising means for transferring heat from the liquid coolant to the inclined portion.

16. The apparatus according to claim 12, wherein air is moved from the surrounding ambient airspace to the interior of the body.

17. The apparatus according to claim 12, wherein air is moved from the interior of the body to the surrounding ambient airspace.

18. The apparatus according to claim 12, wherein air is moved simultaneously from the surrounding ambient airspace, from the interior of the body, and to the surrounding ambient airspace.

19. The apparatus according to claim 12, further comprising means for circulating the liquid coolant between the electronic component and the bottom panel.

20. An apparatus comprising:
    a body having a bottom panel;
    an electronic component enclosed by the body;
    a heat receiving portion thermally coupled to the electronic component;
    a heat radiating portion including an air channel, the heat radiating portion forming a part of the bottom panel and radiating heat received by the heat receiving portion;
    a liquid cooling path including a liquid coolant and thermally coupled to the heat receiving portion and the heat radiating portion; and
    a pump to circulate the liquid coolant in the liquid cooling path.

21. The apparatus according to claim 20, wherein the heat receiving portion is formed outside the pump.

* * * * *